United States Patent Office 2,871,248
Patented Jan. 27, 1959

2,871,248

GLYCOL DIESTERS

Earl V. Kirkland, Le Marque, and Irvin H. Lutz, Texas City, Tex., assignors to The American Oil Company, Texas City, Tex., a corporation of Texas No Drawing. Application October 31, 1955
Serial No. 544,086

5 Claims. (Cl. 260—410.6)

This invention relates to organic esters and in particular to glycol diesters.

Our invention concerns new compositions of matter. These compositions are glycol diesters which are produced by esterifying ethylene glycol, diethylene glycol, or triethylene glycol with a mixture of carboxylic acids which is produced in the hydrogenation of carbon monoxide in the presence of an iron-type catalyst at a temperature between about 450° and 750° F. and a pressure between about 100 and 700 p. s. i. g. The carboxylic acids should have at least 7 carbon atoms in the molecule, preferably between about 7 and 12 carbon atoms. In the hydrogenation of carbon monoxide over an iron-type catalyst, preferably an alkalized iron-type catalyst, a mixture of different acids is produced. The mixture contains many different carboxylic acids. Some of the acids differ in extend of unsaturation; some differ in the extent of branching in the hydrocarbon chain; but in all cases the mixture contains a substantial amount i. e. 10% to 60% of straight chain acids. When the acid mixture is esterified with the defined glycols, diesters having valuable and unexpected properties are produced. Surprisingly, it has also been found that the glycol should be either ethylene glycol, diethylene glycol, or triethylene glycol, preferably the latter, in order to obtain diester products which have the highly useful and unexpected properties displayed by our diesters.

The diesters of our invention are useful as lubricants because they remain fluid at low temperatures, have a high flash point, and do not change greatly in viscosity as the temperature is varied. For example the diesters of our invention remain fluid at temperatures as low as −90° F. and have a viscosity index as high as 170. These properties make them extremely useful in lubricating turbo-jet aircraft. Jet aircraft operate at altitudes as high as 50,000 feet where some mechanisms are exposed to atmospheric temperatures of −65° F. Oil temperatures of as high as 350° F. are encountered in jet aircraft, with even higher temperatures occurring due to soak back. It is apparent that the lubricating oil must have a very low pour point and a very high viscosity index to be useful in jet aircraft. It must also have a high boiling point and a high flash point. Synthetic lubricants of the diester type which have been developed may be satisfactory with respect to one or more of the above properties, but most frequently they fail to provide all of the desired properties. Usually if they display a satisfactory viscosity index they will tend to set up or freeze at too high a temperature. Conversely if they remain liquid at a sufficiently low temperature, the viscosity index is usually too low.

The diesters of our invention, however, are highly satisfactory with respect to all of the above properties. Our diesters are also useful as lubricating oil additives. They may be used as a partial replacement for petroleum lubricating oils in the lubrication of internal combustion engines such as automotive engines.

It has been found that our diesters are highly efficient plasticizers for polyvinyl resins such as polyvinyl chloride, copolymers of vinyl chloride with vinyl acetate, copolymers of vinyl chloride with vinylidine chloride and the like. Because of the high efficiency of our diesters as plasticizers it is possible to obtain the same results as are obtained with commercial plasticizers of a similar type while employing a lesser amount of our diester. In addition it imparts improved low temperature flexibility over that obtainable with commercial diester plasticizers.

The glycols which may be used in producing our diester are ethylene glycol, diethylene glycol, or triethylene glycol. Other types of polyhydric alcohols such as dipropylene glycol, trimethylolethane, trimethylolpropane, pentaerythritol, and the like do not produce diesters which are satisfactory with respect to both pour point and viscosity index. In general the use of other polyhydric alcohols produces diesters which have a satisfactory pour point but an unsatisfactorily low viscosity index of 90 to 115. This in in marked contrast with the viscosity index of 155 to 170 which is produced when using triethylene glycol. Triethylene glycol is the preferred glycol.

The carboxylic acids which are esterified with the glycol are a mixture of carboxylic acids which is produced in the hydrogenation of carbon monoxide in the presence of an iron-type catalyst at a temperature between about 450° and 750° F. and a pressure between about 100 and 700 p. s. i. g. This process has frequently been termed the synthol process or the hydrocarbon synthesis process. The Hydrocol Process is one specific example of the synthol process. For the sake of convenience the term synthol process will be used when referring to the above-defined process and the term synthol acids will be used when referring to the carboxylic acids produced in the synthol process. Typical conditions used in the synthol process are as follows. Synthesis gas (fresh feed) consisting of 95–98% carbon monoxide and hydrogen in a molar ratio of hydrogen to carbon monoxide of between 1.0–2.5:1 is contacted at a temperature between 450° and 750° F., preferably between 600° and 700° F., with an iron-type catalyst. While pressures of between 100 and 700 p s. i. g. may be used, pressures higher than about 250 p. s. i. g., preferably between 325 and 425 p. s. i. g. are preferred. Gaseous recycle ratios of between about 1 to 2 volumes of recycle gas per volume of fresh feed may be employed. While it will be appreciated that the space velocity can be varied over a considerable range depending upon the extent of conversion of carbon monoxide desired, the type of catalyst, and the type of reactor used, space velocities of between 5 and 15 s. c. f. CO/hr./lb. of catalyst are generally satisfactory. While the operating conditions set forth above are those which are usually considered preferable, it is to be strictly understood that any of the known conditions used in the synthol process for producing hydrocarbons and oxygenated chemicals by reacting carbon monoxide and hydrogen at 450°–750° F. and between 100 to 700 p. s. i. g.

over an iron-type catalyst may be used. Catalysts suitable for use in the synthol process are any of those iron-type catalysts known to be useful for producing liquid hydrocarbons and oxygenated chemicals. The iron-type catalyst is preferably promoted with an alkali metal oxide in an amount between about 0.5 to 2.0% by weight. The alkylized iron-type catalyst is effective in increasing the yields of liquid products, especially of the oxygenated chemicals. It is preferred to use a catalyst commonly designated as mill scale (U. S. 2,485,945 to S. W. Walker). This catalyst is prepared from the oxide scale or layer obtained by rolling iron or various alloys thereof at elevated tmperatures, for example, in the range of 1000° to 1300° C. Microscopic examination of the scale or oxide layer thus obtained when ground to a fineness of 325 mesh indicates that it still retains its characteristic plate-like structure. More detailed descriptions of the synthol process may be found in U. S. 2,681,924 to M. B. Kratzer and Encyclopedia of Chemical Technology by Kirk-Othmer, volume 6, pages 972–983 (1951).

The effluent from the reactor is cooled and separated into a gas stream and two liquid streams. The liquid streams consist of an aqueous phase containing water-soluble oxygenated compounds and a hydrocarbon phase containing oil-soluble oxygenated compounds. Usually about 10 to 20% of the total product will consist of oxygenated compounds. The synthol acids employed in preparing our diesters are oil-soluble acids recovered from the hydrocarbon phase. Any of a number of methods may be practiced in recovering the oil-soluble carboxylic acids from the hydrocarbon phase. The alcohols, aldehydes, and ketones may be separated from the hydrocarbon phase by extracting with an aqueous solution of a water soluble bisulfite, followed by extracting the hydrocarbon raffinate with an aqueous solution of a mild alkali such as sodium carbonate (note U. S. 2,457,257) to separate the carboxylic acid salts and then springing and recovering the acids from the salt solution. Alternatively the hydrocarbon phase may be extracted with an alkaline aqueous solution of $C_5$–$C_{18}$ carboxylic acid soaps to produce a rich soap solution containing oxygenated compounds. The oxygenated compounds are steam stripped from the rich soap solution and the carboxylic acids are liberated from the stripped soap solution by the addition of concentrated sulfuric acid. It is preferred, however, to wash the stripped soap solution, prior to the addition of concentrated sulfuric acid, with a solvent such as butane, pentane, isopropylether, or the like which extracts residual amounts of alcohols, aldehydes, and ketones from the stripped aqueous soap solution (note U. S. 2,615,912). Other methods of recovering the oil-soluble carboxylic acids from the hydrocarbon phase are detailed in U. S. 2,670,366 and U. S. 2,645,655.

The mixture of oil-soluble carboxylic acids which is recovered from the hydrocarbon phase consists primarily of acyclic monocarboxylic acids. The mole percent unsaturation of the carboxylic acids may range between 2 and 35%. In general the percent of unsaturation increases with increasing molecular weight of the acid. Unsaturation may occur in different places in the carboxylic acid molecule. The mixture of carboxylic acids contains both straight and branched chain acids. It may contain between 10% and 60% of straight chain acids and between 90% and 40% of branched chain acids, the percentage of branched chain acids increasing with the number of carbon atoms in the acid molecule. Branching occurs in the hydrocarbon chain at various positions, but predominantly at positions near the carboxyl group. Thus the mixture of synthol acids which is produced may contain unsaturated carboxylic acids, straight chain carboxylic acids, and various branched chain carboxylic acids. While we do not wish to be bound by any theory it is believed that the mixture of the straight chain with the various branched chain acids is highly important in producing the diesters which have the unexpected and valuable properties exhibited by our diesters. Analyses of the types and structures of the various carboxylic acids produced during the synthol process, as well as a discussion thereof, is presented in I. & E. Chem., volume 45, page 359–362 (February 1953).

The mixture of oil-soluble carboxylic acids recovered from the hydrocarbon phase is distilled to remove acids having less than 7 carbon atoms in their molecules. The remaining acids having between about 7 and 20 carbon atoms in their molecules may then be esterified with the glycol. The acids may be fractionated to recover fractions which consist primarily of a mixture of acids having the same number of carbon atoms in their molecule. When this is done, it is preferred that the acids have between 7 and 12 carbon atoms, inclusive, per molecule. For example a fraction consisting essentially of a mixture of different carboxylic acids having 9 carbon atoms in their molecule may be esterified with the glycol. The fraction produced need not be split precisely so as to exclude carboxylic acids having a lesser or greater number of carbon atoms. For instance, the oil-soluble synthol acids may be fractionated to produce a fraction containing all of the $C_9$ acids as well as the higher boiling $C_8$ acids and the lower boiling $C_{10}$ acids. The higher boiling $C_8$ acids are straight chain acids and contribute toward a good viscosity and viscosity index, and the lower boiling $C_{10}$ acids are branched chain acids and contribute toward a low pour point. The fraction of the synthol acid which is esterified may contain a wide range of acids having different numbers of carbon atoms in their molecules, e. g., the mixture may contain acids having from 8 to 12 or from 7 to 16 carbon atoms in their molecules so that no one carbon chain length acid constitutes a major proportion of the mixture esterified. Although it is not essential, it is preferable to hydrogenate the synthol acid mixture to reduce the extent of unsaturation of the carboxylic acids. This may conveniently be done prior to fractionating the acids. It should, of course, be understood that the synthol acids used may contain minor proportions of impurities such as non-acid chemicals, water, and the like. Inspections of typical fractions of hydrogenated oil-soluble synthol acids useful in preparing the diesters of our invention are shown in the table which follows:

SYNTHOL ACID INSPECTIONS

| Synthol Acid | $C_7$ | $C_8$ | $C_9$–$C_{10}$ | $C_{11}$–$C_{12}$ |
|---|---|---|---|---|
| Composition, Wt. Percent: | | | | |
| Nonacid Chemicals | 1.3 | 0.8 | 2.1 | 4.6 |
| Water | 0.2 | 0.2 | 0.2 | 0.2 |
| Acid— | | | | |
| $C_6$ | 0.6 | | | |
| $C_7$ | 91.7 | 5.0 | | |
| $C_8$ | 6.2 | 91.9 | 11.1 | |
| $C_9$ | | 2.1 | 54.4 | |
| $C_{10}$ | | | 32.2 | 22.0 |
| $C_{11}$ | | | | 59.1 |
| $C_{12}$ | | | | 14.1 |
| | 100.0 | 100.0 | 100.0 | 100.0 |
| Wt. Percent Branched Acids | 58.6 | 62.5 | 56.6 | 68 |
| Bromine No | 0.4 | 0.4 | 0.9 | 1.9 |
| Density 20°/4° | .922 | .915 | .909 | .909 |

The total amount of acid less the percentage of branched chain acids consists of straight chain acids. It is apparent that the synthol acids contain a substantial quantity e. g. 30 to 40% by weight of straight chain acids.

No novelty is claimed in the method of esterifying synthol acids with the glycol. Any of the usual esterification techniques may be used in producing our diesters. The usual strong mineral acids may be employed as catalysts, although other agents such as salts, silica gel and cation-exchange resins may be used if desired. Sulfuric acid, toluene sulfonic acid, alkane sulfonic acids and the like are very useful catalysts. The synthol acids and the glycol may be mixed and then between 1 and 3% or thereabouts, of an acid such as toluene sulfonic acid may then be added. An entraining agent such as xylenes may be added to the mixture. The mixture may be refluxed and water formed in the reaction may be removed in a trap. Since the monoester of the glycol has very poor viscosity index properties, it is important that formation of the monoesters of the glycol be avoided. For this reason molar ratios in excess of 2 moles of acid per mole of glycol should be used. A molar ratio of acid to glycol of about 2.5 is satisfactory. The crude esters may then be purified by conventional techniques such as by dissolving in a hydrocarbon solvent and washing with a dilute caustic solution (about 2 normal), washing with water, and then drying followed by filtering through clay. The esters may then be distilled from the hydrocarbon solvent to recover the very pure products.

Samples of the synthol acid fractions, whose inspections were listed previously, were esterified with triethylene glycol and the properties of the purified diester were evaluated with respect to viscosity, viscosity index, pour point, and flash point. In all instances herein the Dean and Davis viscosity index is reported. This was determined in accordance with ASTM D567–51, also described in I. & E. Chem., volume 32, pages 102–7 (1940). The diesters were prepared by mixing the synthol acid fraction and triethylene glycol in a molar ratio of 2.5:1 moles of acid per mole of glycol and adding about 2 weight percent of toluene sulfonic acid (based on the amount of glycol) as the catalyst. Xylene was added as an entraining agent and the mixture refluxed. Water formed in the reaction was removed in a trap. When no more water would distill, the crude diester product was recovered by distillation under vacuum. The crude diester samples were dissolved in n-pentane, washed with dilute caustic (2-normal solution), then washed with water and dried over Drierite. The pentane solutions were then filtered through Attapulgus clay and silica gel, and the solutions were then distilled to recover the purified diesters. Evaluation of samples of various synthol fractions which have been esterified with triethylene glycol are shown in Table I which follows.

*Table I.—Synthol acid diesters of triethylene glycol*

| Sample No | 1 | 2 | 3 | 4 | 15 | MIL–L–[1] 7808 B |
|---|---|---|---|---|---|---|
| Acid Fraction Used | $C_7$ | $C_8$ | $C_9$–$C_{10}$ | $C_{11}$–$C_{12}$ | [3] $C_7$+ | |
| Ester B. P., °C. at 1 mm. Hg | 175–195 | 200–215 | 220–238 | [2] 235–250 | | |
| Kin. Vis., cs.: | | | | | | |
| 100° F | 8.0 | 9.0 | 11.2 | 14.97 | 10.8 | 11 |
| 130° F | 5.4 | 6.0 | 7.3 | 9.08 | | |
| 210° F | 2.5 | 2.7 | 3.1 | 3.82 | 3.0 | 3 |
| ASTM Slope | 0.70 | 0.70 | 0.70 | 0.67 | 0.70 | 0.71 |
| V.I. | 154 | 155 | 156 | 170 | 151 | 146 |
| Pour Point, °F | −88 | −90 | −70 | −55 | <−70 | −75 |
| Flash Point, °F | 395 | 440 | 445 | 465 | 440 | 350 |

[1] U. S. Government Military Specification.
[2] At 0.5 mm. Hg.
[3] Contained about 80% of $C_7$–$C_{12}$ and 20% of $C_{12}$–$C_{20}$. Esters prepared by completely esterifying higher boiling 50% of acids with excess of glycol and then completing esterification with an excess of the lower boiling 50% of the acids.

The data shown in the above table point out the very high viscosity index, the high flash point, and the low pour point of the diesters of our invention. That the diesters are very superior in these three properties is quite surprising since most diesters are deficient in at least one respect.

The separate samples of the $C_{11}$–$C_{12}$ synthol acid fraction, whose inspection has been presented previously, were esterified with ethylene glycol, diethylene glycol, and triethylene glycol. The esterification technique and the purification of the esters were carried out in the manner previously described. The purified diesters were evaluated for viscosity index, pour point, and flash point. The results are shown in Table II which follows.

*Table II.—$C_{11}$–$C_{12}$ synthol acid diesters*

| Sample No | 4 | 5 | 6 | MIL–L– 7808 B |
|---|---|---|---|---|
| Glycol Used | Triethylene Glycol | Diethylene Glycol | Ethylene Glycol | |
| Ester Boiling Range, °C. (mm. Hg) at 1 mm. Hg | 235–250 [1] | 213–228 | 182–199 | |
| Kin. Vis., cs.: | | | | |
| 100° F | 14.97 | 12.96 | 10.9 | 11 |
| 210° F | 3.82 | 3.28 | 3.0 | 3 |
| ASTM Slope | 0.67 | 0.67 | 0.70 | 0.715 |
| V. I. | 170 | 140 | 148 | 146 |
| Pour point, °F | −55 | −70 | | −75 |
| Flash Point, °F | 465 | 450 | | 350 |

[1] At 0.5 mm. Hg.

It is apparent from the data in Table II that ethylene glycol, diethylene glycol, or triethylene glycol may be employed in preparing our diesters. Triethylene glycol, however, is preferred. A number of esters were prepared from different polyhydric alcohols and acids. These were evaluated with respect to flash point, pour point, and viscosity index and compared with the diesters of our invention. A comparison of these properties of the various esters is shown in Table III which follows.

Table III

| Sample No. | Ester Alcohol | Ester Acid | Flash Point, °F. | Pour Point, °F. | Viscosity Index |
|---|---|---|---|---|---|
| 2 | Triethylene Glycol | $C_8$ Synthol Acid | 440 | −90 | 155 |
| 7 | Dipropylene Glycol | do | | | 90 |
| 8 | Trimethylolethane | do | 485 | <−80 | 116 |
| 9 | Trimethylolpropane | do | 465 | <−80 | 115 |
| 10 | Pentaerythritol | do | 530 | −70 | 111 |
| 2 | Triethylene Glycol | $C_8$ Synthol Acid | 440 | −90 | 155 |
| 3 | do | $C_9$–$C_{10}$ Synthol Acid | 445 | −70 | 156 |
| 11 | do | 2-Ethyl hexoic | | −60 | [1] 99 |
| 12 | Dipropylene Glycol | Nonanoic | | −5 | [2] 141 |
| 13 | Trimethylolethane | do | 535 | +35 | 147 |
| 14 | do | $C_9$ Oxo Acids | 564 | −55 | 85 |

[1] From I. & E. Chem. 39, page 484 (1947).
[2] From I. & E. Chem. 45, page 1767 (1953).

A comparison of the properties of sample 2 with the properties of samples 7 through 10, inclusive, shows that when other polyhydric alcohols such as dipropylene glycol, trimethylolpropane, or pentaerythritol are used in place of the triethylene glycol in producing the ester, the viscosity index of the resultant ester is reduced to about 90 to 115. This indicates the criticality of esterifying the synthol acids with ethylene glycol, diethylene glycol, or triethylene glycol. Comparing runs 2 with run 11 shows that when triethylene glycol is esterified with 2-ethyl hexoix acid instead of a $C_8$ synthol acid mixture, the pour point is raised and the viscosity index is lowered. Thus other synthetic branched-chain carboxylic acids are much less effective than the synthol acid mixture having the same number of carbon atoms (and which contains branched chain acids) for producing diesters of triethylene glycol which are useful as lubricants in jet aircraft. Samples 12 through 14 show that esters of other polyhydric alcohols and esters of other acids either have an undesirably high pour point or an undesirably low viscosity index. Sample 13 which is the trimethylolethane of nonanoic acid (a straight-chain acid) has a rather high viscosity index of 147 but an undesirably high pour point of +35° F. Sample 14 which is the trimethylolethane ester of oxo acids having 9 carbon atoms in their molecule, and which are made by caustic oxidation of the oxo alcohols (the oxo acids have branched hydrocarbon chains), have a fairly low pour point of −55° F. but a very poor viscosity index of 85. This demonstrates the uniqueness of our synthol acid diesters of ethylene, diethylene, or triethylene glycol.

In addition to their superior utility as synthetic lubricants, our diesters are also highly efficient plasticizers and are especially useful as coplasticizers. They may be used to plasticize polyvinyl resins such as polyvinyl chloride, copolymers of vinyl chloride with other vinyl compounds such as vinyl acetate, vinylidine chloride, and the like. We have found that their high efficiency enables using our diesters in smaller amounts to obtain an equivalent degree of hardness and additional tensile strength in the plasticized resin. They also improve the low temperature flexibility of the plasticized resin over that which is obtained when commercial plasicizers such as dioctyl phthalate are used. Our diesters such as the triethylene glycol diester of the $C_7$ synthol acid mixture may be used as coplasticizers with a plasticizer such as dioctyl phthalate or the like. Resins plasticized or coplasticized with our diester have particular utility under rather cool conditions. This makes them highly useful for plasticizing resins used in outdoor wire coating and for similar resins which are exposed to conditions of extreme cold.

Thus having described our invention, what is claimed is:

1. As compositions of matter, glycol diesters which are produced by esterifying a glycol selected from the group consisting of triethylene glycol, diethylene glycol, ethylene glycol, and mixtures thereof with a mixture of straight and branched chain aliphatic mono-carboxylic acids containing between about 10% and 60% of straight chain acids and between about 90% and 40% of branched chain acids which mixture of acids is produced in the hydrogenation of carbon monoxide in the presence of an iron-type catalyst at a temperature between about 450° and 750° F. and a pressure between about 100 and 700 p. s. i. g., said mixture of straight chain and branched chain acids being selected from those acids which contain from 7 to 20 carbon atoms per molecule, and said mixture of acids having been hydrogenated to reduce its unsaturation prior to esterification with said glycol.

2. The composition of claim 1 wherein the glycol is triethyl glycol.

3. The composition of claim 2 wherein the mixture of straight chain and branched chain acids predominates in acids having 8 carbon atoms per molecule.

4. The composition of claim 2 wherein the mixture of straight chain and branched chain acids predominates in acids having 9 and 10 carbon atoms per molecule.

5. The composition of claim 2 in which the mixture of straight chain and branched chain acids is a mixture of acids having from 7 to 20 carbon atoms in the acid molecules.

References Cited in the file of this patent

UNITED STATES PATENTS

| | | |
|---|---|---|
| 2,229,222 | Reid | Jan. 21, 1941 |
| 2,412,469 | Nicholl et al. | Dec. 10, 1946 |
| 2,469,446 | Strauss | May 10, 1949 |

OTHER REFERENCES

Bried et al.: Ind. Eng. Chem., 39 (1947), pp. 484–91.